US012625756B2

(12) United States Patent
Edgar et al.

(10) Patent No.: US 12,625,756 B2
(45) Date of Patent: May 12, 2026

(54) PROCESSOR CRASH ANALYSIS USING REGISTER SAMPLING

(71) Applicant: SiFive, Inc., San Mateo, CA (US)

(72) Inventors: Ernest L. Edgar, Colorado Springs, CO (US); Bruce Ableidinger, Vancouver, WA (US)

(73) Assignee: SiFive, Inc., Santa Clara, CA (US)

( * ) Notice: Subject to any disclaimer, the term of this patent is extended or adjusted under 35 U.S.C. 154(b) by 0 days.

(21) Appl. No.: 18/579,166

(22) PCT Filed: Jul. 11, 2022

(86) PCT No.: PCT/US2022/036694
§ 371 (c)(1),
(2) Date: Jan. 12, 2024

(87) PCT Pub. No.: WO2023/287708
PCT Pub. Date: Jan. 19, 2023

(65) Prior Publication Data
US 2024/0320078 A1     Sep. 26, 2024

Related U.S. Application Data

(60) Provisional application No. 63/221,262, filed on Jul. 13, 2021.

(51) Int. Cl.
*G06F 11/00*          (2006.01)
*G06F 11/07*          (2006.01)

(52) U.S. Cl.
CPC ........ *G06F 11/079* (2013.01); *G06F 11/0721* (2013.01)

(58) Field of Classification Search
CPC .. G06F 11/079; G06F 11/0721; G06F 11/348; G06F 11/3024
(Continued)

(56) References Cited

U.S. PATENT DOCUMENTS 7,590,892 B2 * 9/2009 Sohm .................. G06F 11/3636
714/38.13
9,824,005 B1 * 11/2017 Helliwell .............. G06F 12/023
(Continued)

FOREIGN PATENT DOCUMENTS

GB          2 281 986 A          3/1995

OTHER PUBLICATIONS

International Search Report for International application No. PCT/US2022/036694 filed Jul. 11, 2022; Mailed Oct. 20, 2022; 14 pages.

*Primary Examiner* — Sarai E Butler
(74) *Attorney, Agent, or Firm* — Kilpatrick Townsend & Stockton LLP

(57)          ABSTRACT

Systems and methods are disclosed for processor crash analysis using register sampling. For example, an integrated circuit may include a processor core configured to execute instructions, wherein the processor core includes a program counter register and an exception program counter register (e.g., a machine exception program counter register) that is configured to store a program counter value that was current when an exception occurred; a data store connected to the exception program counter register via an ingress port that is configured to store a copy of an exception program counter value responsive to retirement of an instruction; and an exception program counter capture register, configured to store an exception program counter value from the second data store responsive to a reset signal for the processor core.

18 Claims, 3 Drawing Sheets

200

SAMPLE PC REGISTER — 210

SAMPLE EPC REGISTER — 220

STORE SAMPLED PC VALUE IN PC CAPTURE REGISTER RESPONSIVE TO RESET SIGNAL — 230

STORE SAMPLED EPC VALUE IN EPC CAPTURE REGISTER RESPONSIVE TO RESET SIGNAL — 240

READ VALUES IN PC CAPTURE REGISTER AND EPC CAPTURE REGISTER AFTER RESET — 250

(58) Field of Classification Search
USPC ........................................................ 714/1–57
See application file for complete search history.

(56) References Cited

U.S. PATENT DOCUMENTS

| | | | | |
|---|---|---|---|---|
| 2006/0069952 | A1 | 3/2006 | Peled et al. | |
| 2006/0161763 | A1* | 7/2006 | Ito ........................ | G06F 9/30032 |
| | | | | 712/241 |
| 2007/0016906 | A1* | 1/2007 | Trauben ................ | G06F 9/4843 |
| | | | | 718/102 |
| 2008/0016509 | A1* | 1/2008 | Kamiya .............. | G06F 11/0715 |
| | | | | 718/103 |
| 2009/0187789 | A1* | 7/2009 | Moyer ................ | G06F 11/3656 |
| | | | | 714/E11.002 |
| 2009/0307527 | A1* | 12/2009 | Robbins ............... | G06Q 10/087 |
| | | | | 714/57 |
| 2011/0107312 | A1* | 5/2011 | Siedel ..................... | G06F 9/445 |
| | | | | 717/129 |
| 2013/0145137 | A1* | 6/2013 | Sartorius ............. | G06F 11/1441 |
| | | | | 713/1 |
| 2015/0254157 | A1* | 9/2015 | Peck ................... | G06F 11/3466 |
| | | | | 714/45 |
| 2015/0346260 | A1* | 12/2015 | Jiang ...................... | G01R 31/50 |
| | | | | 324/538 |
| 2018/0145846 | A1* | 5/2018 | Vangeel .................. | G06F 11/07 |
| 2020/0326950 | A1* | 10/2020 | Hanzawa .............. | G06F 9/3842 |
| 2020/0353173 | A1* | 11/2020 | Holmquist .............. | A61M 5/20 |
| 2020/0387659 | A1* | 12/2020 | Wachs ................. | G06F 30/333 |
| 2021/0103503 | A1* | 4/2021 | Horsnell ............. | G06F 11/0721 |
| 2021/0389953 | A1* | 12/2021 | Sharma .............. | G06F 9/30036 |

* cited by examiner

200

210

SAMPLE PC REGISTER

220

SAMPLE EPC REGISTER

230

STORE SAMPLED PC VALUE IN PC CAPTURE REGISTER
RESPONSIVE TO RESET SIGNAL

240

STORE SAMPLED EPC VALUE IN EPC CAPTURE REGISTER
RESPONSIVE TO RESET SIGNAL

250

READ VALUES IN PC CAPTURE REGISTER AND EPC
CAPTURE REGISTER AFTER RESET

PROCESSOR CRASH ANALYSIS USING REGISTER SAMPLING

CROSS-REFERENCE TO RELATED APPLICATIONS

This application is a 371 of International Application No. PCT/US2022/036694, filed on Jul. 11, 2022, which claims the benefit of U.S. Provisional Application 63/221,262 filed on Jul. 13, 2021. The entire contents of these applications are incorporated herein by reference in their entirety.

TECHNICAL FIELD

This disclosure relates to processor crash analysis using register sampling.

BACKGROUND

Instruction tracing is a technique used to analyze the history of instructions executed by a processor. Information associated with one or more instructions may be collected from a processor executing the instructions. The information collected may be analyzed to determine system performance and to help identify possible optimizations for improving the system.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Overview

Figure 1:
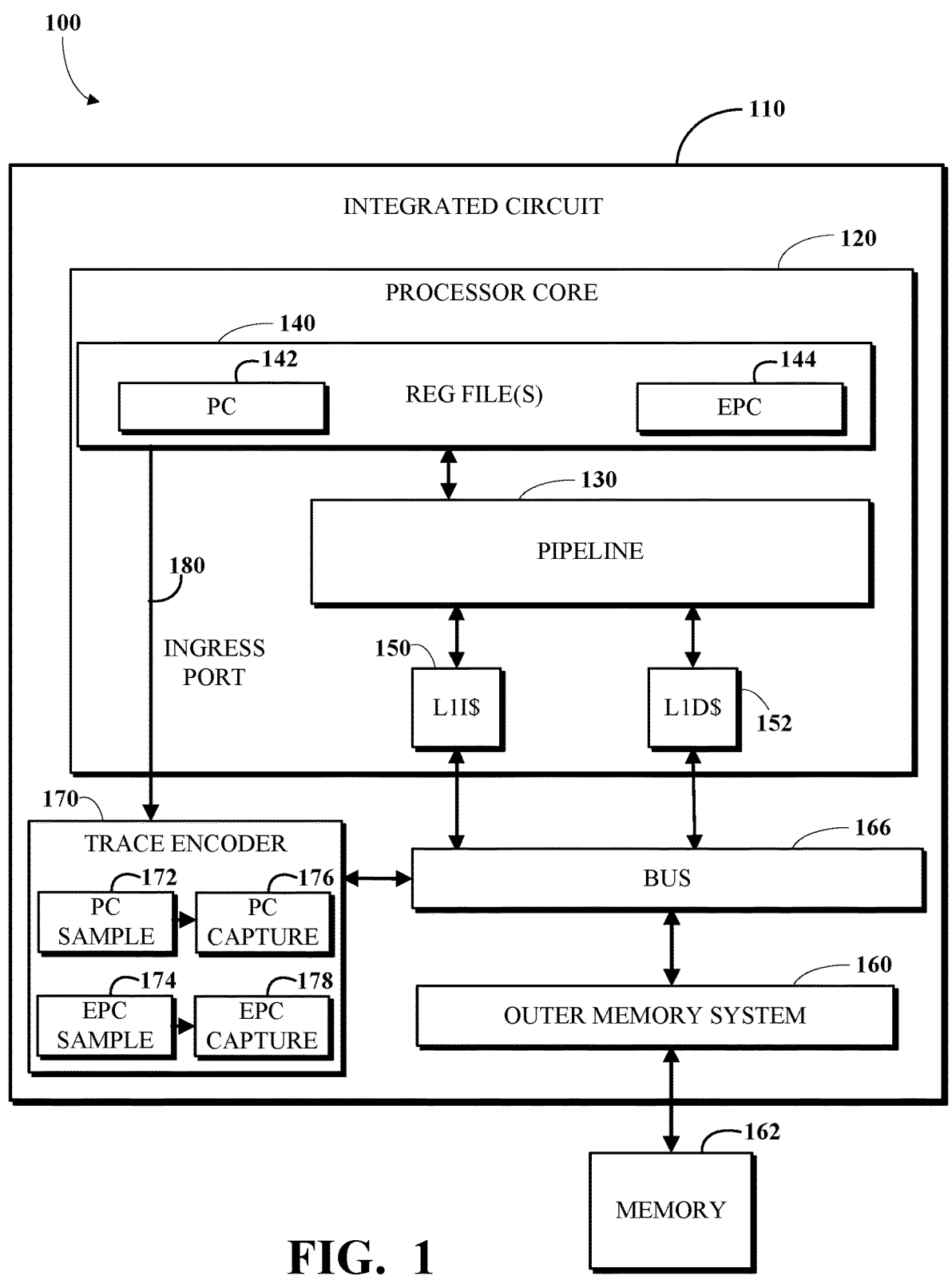
FIG. 1 is block diagram of an example of a system for executing instructions with processor crash analysis using register capture.

Disclosed herein are implementations of processor crash analysis using register capture. An integrated circuit (e.g., a processor or microcontroller) may be configured to sample a program counter and an exception program counter (e.g., a machine exception program counter) of a processor core of the integrated circuit responsive to instruction retirement. The sampled register values may be stored in capture registers responsive to a reset signal for the processor core to preserve these register values through a reset that results from the reset signal.

For example, the program counter and a machine exception program counter register values may be sampled using signals in an ingress port of the processor core. The ingress port may include signals, such as, a "reset" signal indicating that core is being reset, a "iretire" signal indicating that an instruction has been executed and an "iaddr" which indicates an address (the PC) of the instruction being retired. When an MEPC capture option is activated, the MEPC register is also connected from the core to sampling circuitry outside of the processor core (e.g., in a trace encoder circuitry). This information may be used in capture hardware to preserve parts of the processor core state through a reset.

The Capture hardware may be configured such that, when iretire occurs, iaddr and mepc are stored into sampling registers. When a reset occurs due to a crash, the latest values in the sampling registers may be copied to the capture registers. Boot code following the reset can read out the capture registers to get the values of PC and MEPC at the time of the crash.

PC Sampling Unit

Since the Trace Encoder directly connects to the core's TracedInstruction output bundle, it is relatively easy to add a PC Sampling Unit that provides a read-only interface to the current execution address. In some hang scenarios, this information is useful to be able to pinpoint what the core was doing just prior to the hang. This interface can also be used for non-intrusive statistical profiling.

In systems with a watchdog timer that resets the core upon timeout, it is also useful to capture the address of the last retired instruction so that it can be read out as part of a crash analysis. The pcCapture registers capture a new sample on each occurrence of the core reset.

Register Descriptions

This section describes the functionality of the PC Sampling Unit registers for an example implementation of a system for processor crash analysis using register capture.

TABLE 1

| PC Sample Control Register PC Sample Control Register (pcControl) | | | | |
|---|---|---|---|---|
| Address Offset | | | 0 x 0100 | |
| Bits | Field Name | Attr. | Rst. | Description |
| 0 | pcActive | RW | 0 x 0 | Master enable/reset for PC Sampling Unit. pcActive must be set to 1 before any other fields in pcControl are programmed. This bit is reset to 0 by the trace reset input and must be set to 0 x 1 in order to perform sampling. The clock to the PC Sampling Unit may be gated off when pcActive = 0. Note that pcActive is not dependent on teActive, so the PC Sampling Unit can be enabled while the rest of the trace encoder is disabled. |
| [31:1] | Reserved | RO | 0 x 0 | |

TABLE 2

PC Capture and Sample Implementation Register
PC Capture/Sample Implementation Register (pcImp))

| Address Offset | | | | 0 × 0104 |
| --- | --- | --- | --- | --- |

| Bits | Field Name | Attr. | Rst. | Description |
| --- | --- | --- | --- | --- |
| [15:0] | pcCaptureFields | RO | preset | Bitmap indicating which core registers other than PC are present in the PC Capture register range. RC is always present. Capture registers are populated downward from 0 × 134 in the order listed (bit 0 to 15) with no gaps. Core registers in this list that are more than 32 bits occupy two capture register locations with the least significant word at the higher address.<br>bit 0 = mepc<br>bits [15:1] = Reserved |
| [31:16] | pcSampleFields | RO | preset | Bitmap indicating which core registers other than PC are present in the PC Sample register range. PC is always present. Sample registers are populated downward from 0 × 174 in the order listed (bit 0 to 15) with no gaps. Core registers in this list that are more than 32 bits occupy two sample register locations with the least significant word at the higher address.<br>bits [15:0] = Reserved |

TABLE 3

PC Capture Register
PC Capture Register (pcCapture)

| Address Offset | | | | 0 × 013C |
| --- | --- | --- | --- | --- |

| Bits | Field Name | Attr | Rst. | Description |
| --- | --- | --- | --- | --- |
| 0 | pcCaptureValid | RO | 0 × 0 | The pcCapture/pcCaptureH registers contain a valid capture. This bit is reset to 0 when pcActive = 0 and becomes 1 when there is an instruction retirement followed some time by a core reset. |
| [31:1] | pcCapture | RO | 0 × 0 | Address of the last instruction retired prior to the most recent core reset. |

TABLE 4

PC Capture High Register
PC Capture High Register (pcCaptureHigh)

| Address Offset | | | | 0 × 0138 |
| --- | --- | --- | --- | --- |

| Bits | Field Name | Attr. | Rst. | Description |
| --- | --- | --- | --- | --- |
| [N:0] | pcCaptureH | RO | 0 × 0 | If the core address is more than 32 bits, this register reflects bits [N:32] of the address of the PC Capture register. Reads as zero in systems without PC Sampling or with an address width of 32 bits or less. |

TABLE 5

| Bits | Field Name | Attr. | Rst. | Description |
|------|-----------|-------|------|-------------|
| header | Flexible Capture Registers Flexible Capture Registers (pcRegCapture) | | | |
| Address Offset | | 0 × 0108-0 × 0134 | | |
| [31:0] | regCapture | RO | — | Contents of a designated core register when the last instruction was retired prior to the most recent core reset. Correspondence of core registers to capture registers may be determined by reading pcImp1. |

TABLE 6

| Bits | Field Name | Attr. | Rst. | Description |
|------|-----------|-------|------|-------------|
| header | PC Sample Register PC Sample Register (pcSample) | | | |
| Address Offset | | 0 × 017C | | |
| 0 | pcSampleValid | RO | 0 × 0 | The pcSample/pcSampleH registers contain a valid sample that has not yet been read. This bit is reset to 0 when pcActive = 0 and becomes 1 when the core retires an instruction. This bit is so reset when pcSample is read. |
| [31:1] | pcSample | RO | 0 × 0 | Address of most recent retired instruction. |

TABLE 7

| Bits | Field Name | Attr. | Rst. | Description |
|------|-----------|-------|------|-------------|
| header | PC Sample High Register PC Sample High Register (pcSampleHigh) | | | |
| Address Offset | | 0 × 0178 | | |
| [N:0] | pcSampleH | RO | 0 × 0 | If the core address is more than 32 bits, this register reflects bits [N:32] of the address of the most recent retired instruction. Reads as zero in systems without PC Sampling or with an address width of 32 bits or less. Since a full PC sample covers more than one register, hardware is provided to latch the full sample when any one of the sample registers below pcSample is read. in this way, reading an address range starting with a lower address and ending with pcSample will provide the values of all the fields at the time the first register as read. There is space in the address map below pcSampleHigh for additional fields to be added in the future. |

When a processor core (e.g., a RISC-V processor core) takes an exception, it can be configured to handle the exception in machine mode and store the PC into the machine exception program counter (PC→MEPC). A processor core can also be configured to handle the exception in supervisor mode (PC→SEPC), virtual supervisor mode (PC→VSEPC), or user mode (PC→UEPC). Various combinations of these types of exception program counter registers can have their values sampled and capture as described herein. If a system is implemented with any of these other modes, a ingress port of the processor core could include the corresponding xEPC register(s) and there would be a separate SAMPLE and CAPTURE register in a trace encoder, or elsewhere in an integrated circuit, to store values from these xEPC registers.

Implementations described herein may provide advantages over conventional processor architectures, such as, for example, enabling analysis of the last instructions and interrupts that were being executed when a processor core crashes, and facilitating non-intrusive statistical profiling of execution in a processor core.

These and other aspects of the present disclosure are disclosed in the following detailed description, the appended claims, and the accompanying figures.

As used herein, the term "circuitry" refers to an arrangement of electronic components (e.g., transistors, resistors, capacitors, and/or inductors) that is structured to implement one or more functions. For example, a circuit may include one or more transistors interconnected to form logic gates that collectively implement a logical function.

Details

FIG. 1 is block diagram of an example of a system 100 for executing instructions with processor crash analysis using register capture. The system 100 includes an integrated circuit 110 (e.g., a processor or microcontroller) for executing instructions. The integrated circuit 110 includes a processor core 120 including a processor pipeline 130 configured to execute instructions. The processor core 120 includes one or more register files 140 that include a register 142 configured to store a program counter and a register 144 configured to store an exception program counter (e.g., a machine exception program counter (MEPC), a supervisor exception program counter (SEPC), a user exception program counter (UEPC), or a virtual supervisor exception program counter (VSEPC)). The processor core 120 includes an L1 instruction cache 150 and an L1 data cache 152. The integrated circuit 110 includes an outer memory system 160, which may include memory storing instructions and data and/or provide access to a memory 162 external to the integrated circuit 110 that stores instructions and/or data. The integrated circuit 110 includes a bus 166 that enables communication between the processor core 120 and various other components of the integrated circuit 110, including the outer memory system 160. The integrated circuit 110 includes a trace encoder 170 that is configured to manage the capture and export of a trace of execution in the processor core 120. The trace encoder 170 includes a data store 172 configured to store samples of the program counter register 142 values. The trace encoder 170 includes a data store 174 configured to store samples of the exception program counter register 144 values. The trace encoder 170 includes a program counter capture register 176 to store a value from the data store 172 responsive to a reset signal for the processor core 120. The trace encoder 170 includes an exception program counter capture register 178 to store a value from the data store 174 responsive to the reset signal for the processor core 120. The processor core 120 includes an egress port 180 that is used to sample the values in the register 142 and in the register 144 responsive to retirement of instructions in the processor pipeline 130. The integrated circuit 110 may provide advantages over conventional processor architectures, such as, for example, enabling analysis of the last instructions and interrupts that were being executed when the processor core 120 crashes, and facilitating non-intrusive statistical profiling of execution in the processor core 120. For example, the integrated circuit 110 may implement the technique 200 of FIG. 2.

The integrated circuit 110 includes a processor core 120 including a processor pipeline 130 configured to execute instructions. The processor pipeline 130 may include one or more fetch stages that are configured to retrieve instructions from a memory system of the integrated circuit 110. For example, the processor pipeline 130 may fetch instructions via the L1 instruction cache 150. The processor pipeline 130 may include additional stages, such as decode, rename, dispatch, issue, execute, memory access, and write-back stages. For example, the processor pipeline 130 may be configured to execute instructions of a RISC V instruction set.

The integrated circuit 110 includes an L1 instruction cache 150 for the processor core 120. The L1 instruction cache 150 may be a set-associative cache for instruction memory. To avoid the long latency of reading a tag array and a data array in series, and the high power of reading the arrays in parallel, a way predictor may be used. The way predictor may be accessed in an early fetch stage and the hit way may be encoded into the read index of the data array. The tag array may be accessed in later fetch stage and is only used for verifying the way predictor.

The integrated circuit 110 includes an L1 data cache 152 for the processor core 120. For example, the L1 data cache 152 may be a set-associative VIPT cache, meaning that it is indexed purely with virtual address bits VA[set] and tagged fully with all translate physical address bits PA[msb:12]. For low power consumption, the tag and data arrays may be looked up in serial so that at most a single data SRAM way is accessed. For example, the line size of the L1 data cache 152 may be 64 Bytes, and the beat size may be 16 Bytes.

The integrated circuit 110 includes an outer memory system 160, which may include memory storing instructions and data and/or provide access to a memory 162 external to the integrated circuit that stores instructions and/or data. For example, the outer memory system 160 may include an L2 cache, which may be configured to implement a cache coherency protocol/policy to maintain cache coherency across multiple L1 caches. Although not shown in FIG. 1, the integrated circuit 110 may include multiple processor cores in some implementations. For example, the outer memory system 160 may include multiple layers.

Figure 2:
FIG. 2 is flow chart of an example of a technique for processor crash analysis using register capture.
Figure 2:
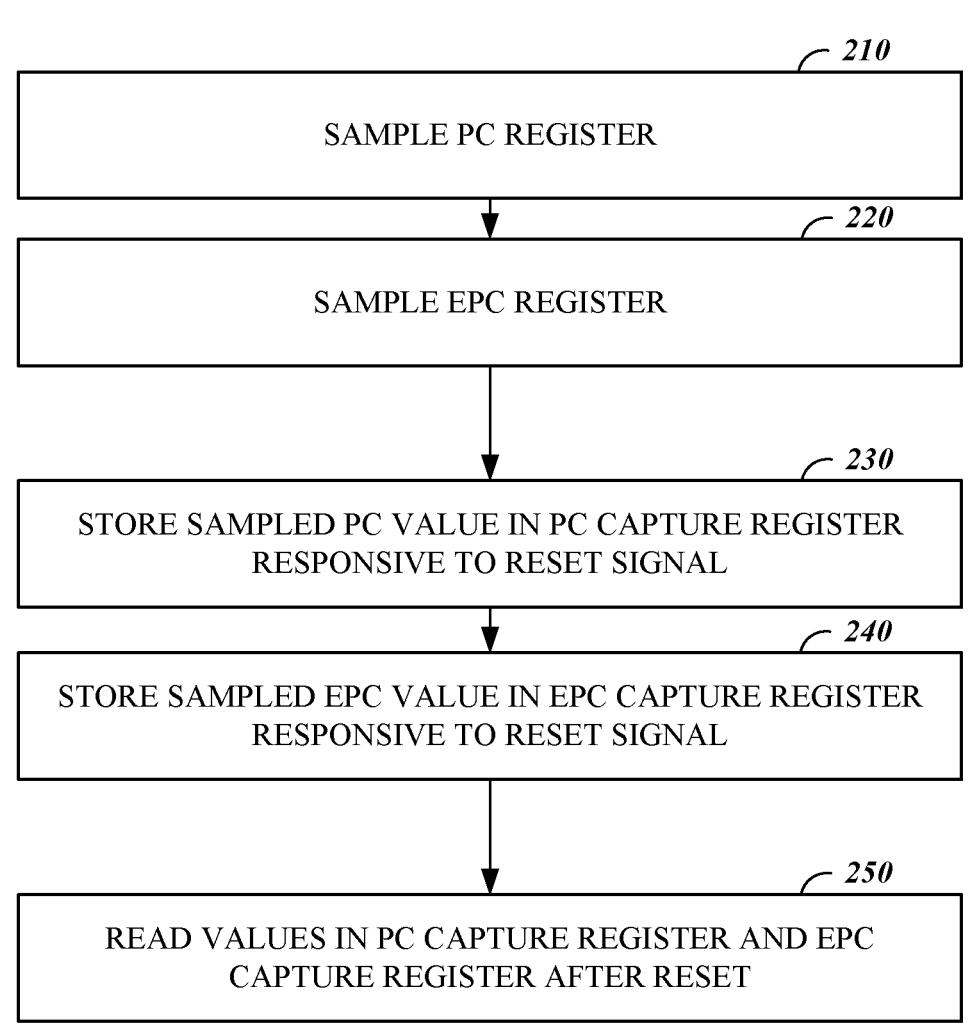

FIG. 2 is flow chart of an example of a technique 200 for processor crash analysis using register capture. The technique 200 includes sampling 210 a program counter register responsive to retirement of instructions by a processor core; sampling 220 an exception program counter register (e.g., an MEPC register, an SEPC register, a UEPC register, or a VSEPC register) responsive to retirement of instructions by the processor core, wherein the exception program counter register is configured to store a program counter value that was current when an exception occurred; storing 230 a sampled value of the program counter register in a program counter capture register responsive to a reset signal for the processor core; storing 240 a sampled value of the exception program counter register in an exception program counter capture register responsive to the reset signal for the processor core; and, after a reset of the processor core caused by the reset signal, reading 250 the program counter capture register and the exception program counter capture register. The technique 200 may provide advantages over conventional techniques, such as, for example, enabling analysis of the last instructions and interrupts that were being executed when a processor core crashes, and facilitating non-intrusive statistical profiling of execution in a processor core. For example, the technique 200 may be implemented using the integrated circuit 110 of FIG. 1.

The technique 200 includes sampling 210 a program counter register (e.g., the program counter register 142) responsive to retirement of instructions by a processor core; and sampling 220 an exception program counter register (e.g., the exception program counter register 144) responsive to retirement of instructions by the processor core. The exception program counter register is configured to store a program counter value that was current when an exception occurred. In some implementations, the program counter register and the exception program counter register are sampled via an ingress port (e.g., the ingress port 180). For example, the ingress port may include an "iretire" signal indicating that an instruction has been executed and retired, and the sampling 210 of the program counter register and the sampling 220 of the exception program counter register may be triggered by the "iretire" of the ingress port.

The technique 200 includes storing 230 a sampled value of the program counter register in a program counter capture register (e.g., the program counter capture register 176) responsive to a reset signal for the processor core; and storing 240 a sampled value of the exception program counter register in an exception program counter capture register (e.g., the exception program counter capture register 178) responsive to the reset signal for the processor core. For example, the ingress port may include a "reset" signal indicating that indicating that core is being reset, and the storing 230 a sampled value of the program counter register in the program counter capture register and storing 240 a sampled value of the exception program counter register in an exception program counter capture register may be triggered by the "reset" signal of the ingress port.

The technique 200 includes, after a reset of the processor core caused by the reset signal, reading 250 the program counter capture register and the exception program counter capture register. For example, the program counter capture register and the exception program counter capture register may be memory mapped. In some implementations, the program counter capture register and the exception program counter capture register are read 250 by boot software after the reset.

Figure 3:
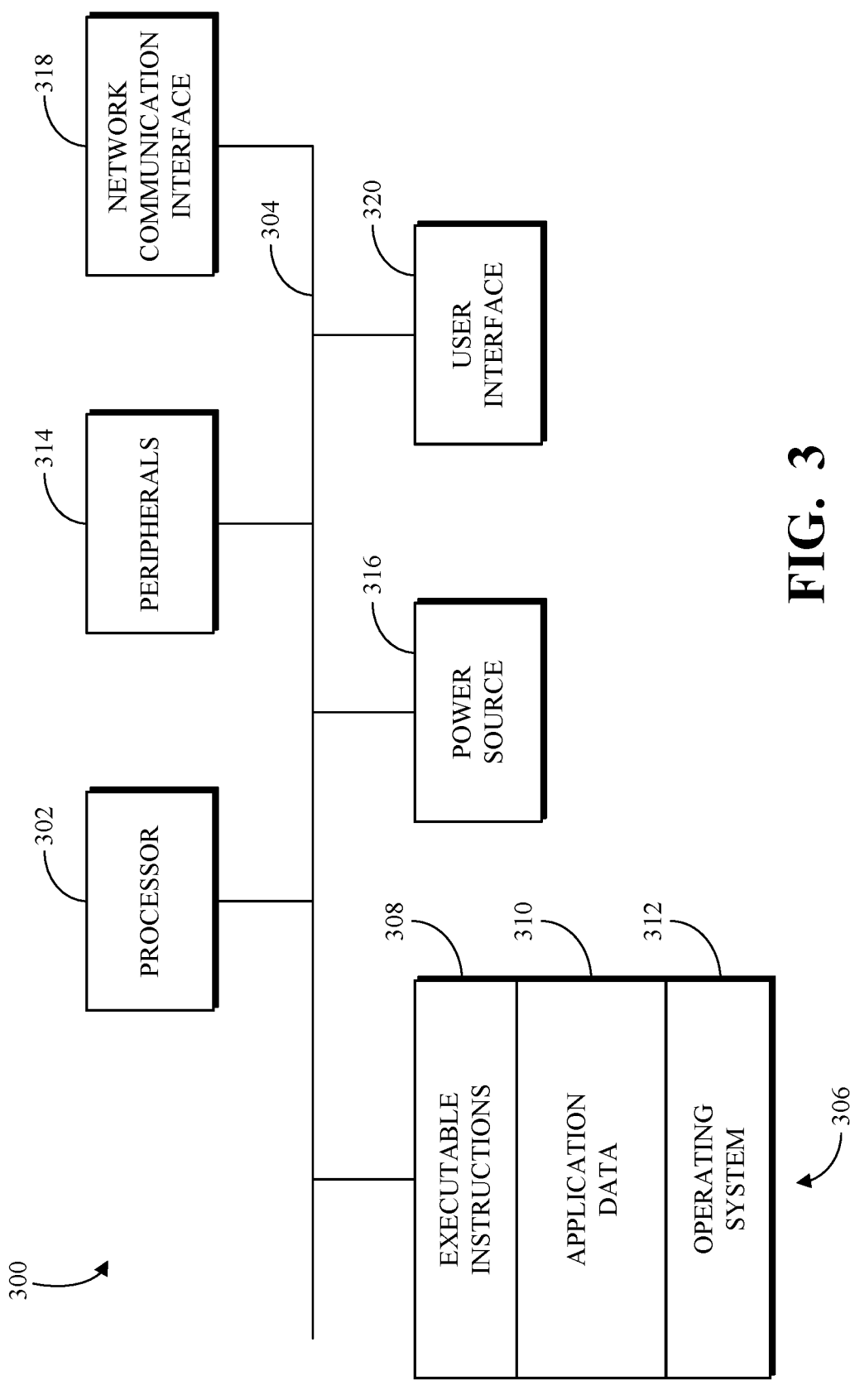
FIG. 3 is a block diagram of an example of a system for facilitating generation of a circuit representation.

FIG. 3 is a block diagram of an example of a system 300 for facilitating generation of a circuit representation, and/or for programming or manufacturing an integrated circuit. The system 300 is an example of an internal configuration of a computing device. For example, the system 300 may be used to generate a file that generates a circuit representation of an integrated circuit (e.g., the integrated circuit 110), including a processor core (e.g., the processor core 120) and a trace encoder (e.g., the trace encoder 170). The system 300 can include components or units, such as a processor 302, a bus 304, a memory 306, peripherals 314, a power source 316, a network communication interface 318, a user interface 320, other suitable components, or a combination thereof.

The processor 302 can be a central processing unit (CPU), such as a microprocessor, and can include single or multiple processors having single or multiple processing cores. Alternatively, the processor 302 can include another type of device, or multiple devices, now existing or hereafter developed, capable of manipulating or processing information. For example, the processor 302 can include multiple processors interconnected in any manner, including hardwired or networked, including wirelessly networked. In some implementations, the operations of the processor 302 can be distributed across multiple physical devices or units that can be coupled directly or across a local area or other suitable type of network. In some implementations, the processor 302 can include a cache, or cache memory, for local storage of operating data or instructions.

The memory 306 can include volatile memory, non-volatile memory, or a combination thereof. For example, the memory 306 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 306 can include another type of device, or multiple devices, now existing or hereafter developed, capable of storing data or instructions for processing by the processor 302. The processor 302 can access or manipulate data in the memory 306 via the bus 304. Although shown as a single block in FIG. 3, the memory 306 can be implemented as multiple units. For example, a system 300 can include volatile memory, such as random-access memory (RAM), and persistent memory, such as a hard drive or other storage.

The memory 306 can include executable instructions 308, data, such as application data 310, an operating system 312, or a combination thereof, for immediate access by the processor 302. The executable instructions 308 can include, for example, one or more application programs, which can be loaded or copied, in whole or in part, from non-volatile memory to volatile memory to be executed by the processor 302. The executable instructions 308 can be organized into programmable modules or algorithms, functional programs, codes, code segments, or combinations thereof to perform various functions described herein. For example, the executable instructions 308 can include instructions executable by the processor 302 to cause the system 300 to automatically, in response to a command, generate an integrated circuit design and associated test results based on a design parameters data structure. The application data 310 can include, for example, user files, database catalogs or dictionaries, configuration information or functional programs, such as a web browser, a web server, a database server, or a combination thereof. The operating system 312 can be, for example, Microsoft Windows®, macOS®, or Linux®: an operating system for a small device, such as a smartphone or tablet device: or an operating system for a large device, such as a mainframe computer. The memory 306 can comprise one or more devices and can utilize one or more types of storage, such as solid-state or magnetic storage.

The peripherals 314 can be coupled to the processor 302 via the bus 304. The peripherals 314 can be sensors or detectors, or devices containing any number of sensors or detectors, which can monitor the system 300 itself or the environment around the system 300. For example, a system 300 can contain a temperature sensor for measuring temperatures of components of the system 300, such as the processor 302. Other sensors or detectors can be used with the system 300, as can be contemplated. In some implementations, the power source 316 can be a battery, and the system 300 can operate independently of an external power distribution system. Any of the components of the system 300, such as the peripherals 314 or the power source 316, can communicate with the processor 302 via the bus 304.

The network communication interface 318 can also be coupled to the processor 302 via the bus 304. In some implementations, the network communication interface 318 can comprise one or more transceivers. The network communication interface 318 can, for example, provide a connection or link to a network, via a network interface, which can be a wired network interface, such as Ethernet, or a wireless network interface. For example, the system 300 can communicate with other devices via the network communication interface 318 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 320 can include a display: a positional input device, such as a mouse, touchpad, touchscreen, or the like: a keyboard: or other suitable human or machine interface devices. The user interface 320 can be coupled to the processor 302 via the bus 304. Other interface devices that permit a user to program or otherwise use the system 300 can be provided in addition to or as an alternative to a display. In some implementations, the user interface 320 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 314. The operations of the processor 302 can be distributed across multiple clients or servers, which can be coupled directly or across a local area or other suitable type of network. The memory 306 can be distributed across multiple clients or servers, such as network-based memory or memory in multiple clients or servers performing the operations of clients or servers. Although depicted here as a single bus, the bus 304 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming. In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

In a first aspect, the subject matter described in this specification can be embodied in an integrated circuit for executing instructions that includes a processor core configured to execute instructions, wherein the processor core includes a program counter register and an exception program counter register that is configured to store a program counter value that was current when an exception occurred: a first data store connected to the program counter register via an ingress port that is configured to store a copy of a program counter value for an instruction responsive to retirement of the instruction: a second data store connected to the exception program counter register via the ingress port that is configured to store a copy of an exception program counter value responsive to retirement of the instruction: a program counter capture register, configured to store a program counter value from the first data store responsive to a reset signal for the processor core; and an exception program counter capture register, configured to store an exception program counter value from the second data store responsive to the reset signal for the processor core. In the first aspect, the values stored in the program counter capture register and the exception program counter capture register may be retained through a reset of the processor core caused by the reset signal. In some implementations, the first data store, the second data store, program counter capture register, and the exception program counter capture register are components of a trace encoder circuitry. In the first aspect, the exception program counter register may be a machine exception program counter register. In the first aspect, the exception program counter register may be a supervisor exception program counter register. In the first aspect, the exception program counter register may be a user exception program counter register. In the first aspect, the exception program counter register may be a virtual supervisor exception program counter register.

In a second aspect, the subject matter described in this specification can be embodied in methods that include sampling a program counter register responsive to retirement of instructions by a processor core: sampling an exception program counter register responsive to retirement of instructions by the processor core, wherein the exception program counter register is configured to store a program counter value that was current when an exception occurred: storing a sampled value of the program counter register in a program counter capture register responsive to a reset signal for the processor core: storing a sampled value of the exception program counter register in an exception program counter capture register responsive to the reset signal for the processor core; and, after a reset of the processor core caused by the reset signal, reading the program counter capture register and the exception program counter capture register. In the second aspect, the program counter register and the exception program counter register may be sampled via an ingress port. In the second aspect, the exception program counter register may be a machine exception program counter register. In the second aspect, the exception program counter register may be a supervisor exception program counter register. In the second aspect, the exception program counter register may be a user exception program counter register. In the second aspect, the exception program counter register may be a virtual supervisor exception program counter register.

In a third aspect, the subject matter described in this specification can be embodied in a non-transitory computer readable medium comprising a circuit representation that, when processed by a computer, is used to program or manufacture an integrated circuit that includes a processor core configured to execute instructions, wherein the processor core includes a program counter register and an exception program counter register that is configured to store a program counter value that was current when an exception occurred: a first data store connected to the program counter register via an ingress port that is configured to store a copy of a program counter value for an instruction responsive to retirement of the instruction; a second data store connected to the exception program counter register via the ingress port that is configured to store a copy of an exception program counter value responsive to retirement of the instruction; a program counter capture register, configured to store a program counter value from the first data store responsive to a reset signal for the processor core; and an exception program counter capture register, configured to store an exception program counter value from the second data store responsive to the reset signal for the processor core. In the third aspect, the values stored in the program counter capture register and the exception program counter capture register may be retained through a reset of the processor core caused by the reset signal. In some implementations, the first data store, the second data store, program counter capture register, and the exception program counter capture register are components of a trace encoder circuitry. In the third aspect, the exception program counter register may be a machine exception program counter register. In the third aspect, the exception program counter register may be a supervisor exception program counter register. In the third aspect, the exception program counter register may be a user exception program counter register. In the third aspect, the exception program counter register may be a virtual supervisor exception program counter register.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An integrated circuit for executing instructions comprising:

a processor core configured to execute instructions, wherein the processor core includes a program counter register and an exception program counter register that is configured to store a program counter value that was current when an exception occurred;

a trace encoder circuitry outside the processor core and connected to the processor core via an ingress port, the trace encoder circuitry comprising:

a first sampling data store connected to the program counter register via the ingress port that is configured to store a copy of a program counter value for an instruction responsive to retirement of the instruction, wherein the first data store is outside the processor core and is connected to the processor core via the ingress port;

a second sampling data store connected to the exception program counter register via the ingress port that is configured to store a copy of an exception program counter value responsive to retirement of the instruction;

a program counter capture register, configured to store a program counter value from the first sampling data store responsive to a reset signal for the processor core; and an exception program counter capture register, configured to store an exception program counter value from the second sampling data store responsive to the reset signal for the processor core.

2. The integrated circuit of claim 1, in which values stored in the program counter capture register and the exception program counter capture register are retained through a reset of the processor core caused by the reset signal.

3. The integrated circuit of claim 1, in which the exception program counter register is a machine exception program counter register.

4. The integrated circuit of claim 1, in which the exception program counter register is a supervisor exception program counter register.

5. The integrated circuit of claim 1, in which the exception program counter register is a user exception program counter register.

6. The integrated circuit of claim 1, in which the exception program counter register is a virtual supervisor exception program counter register.

7. A method comprising:

sampling a program counter register responsive to retirement of instructions by a processor core, wherein a sampled value of the program counter register is stored in a first sampling data store outside the processor core, and wherein the first sampling data store is connected to the processor core via an ingress port;

sampling an exception program counter register responsive to retirement of instructions by the processor core, wherein a sampled value of the exception program counter register is stored in a second sampling data store outside the processor core, wherein the exception program counter register is configured to store a program counter value that was current when an exception occurred;

storing the sampled value of the program counter register from the first sampling data store in a program counter capture register responsive to a reset signal for the processor core;

storing the sampled value of the exception program counter register from the second sampling data store in an exception program counter capture register responsive to the reset signal for the processor core; and after a reset of the processor core caused by the reset signal, reading the program counter capture register and the exception program counter capture register.

8. The method of claim 7, wherein the program counter register and the exception program counter register are sampled via the ingress port.

9. The method of claim 7, in which the exception program counter register is a machine exception program counter register.

10. The method of claim 7, in which the exception program counter register is a supervisor exception program counter register.

11. The method of claim 7, in which the exception program counter register is a user exception program counter register.

12. The method of claim 7, in which the exception program counter register is a virtual supervisor exception program counter register.

13. A non-transitory computer readable medium comprising a circuit representation that, when processed by a computer, is used to program or manufacture an integrated circuit comprising:

a processor core configured to execute instructions, wherein the processor core includes a program counter register and an exception program counter register that is configured to store a program counter value that was current when an exception occurred;

a trace encoder circuitry outside the processor core and connected to the processor core via an ingress port, the trace encoder circuitry comprising:

a first sampling data store connected to the program counter register via the ingress port that is configured to store a copy of a program counter value for an instruction responsive to retirement of the instruction, wherein the first data store is outside the processor core and is connected to the processor core via the ingress port;

a second sampling data store connected to the exception program counter register via the ingress port that is configured to store a copy of an exception program counter value responsive to retirement of the instruction;

a program counter capture register, configured to store a program counter value from the first sampling data store responsive to a reset signal for the processor core; and an exception program counter capture register, configured to store an exception program counter value from the second sampling data store responsive to the reset signal for the processor core.

14. The non-transitory computer readable medium of claim 13, in which values stored in the program counter capture register and the exception program counter capture register are retained through a reset of the processor core caused by the reset signal.

15. The non-transitory computer readable medium of claim 13, in which the exception program counter register is a machine exception program counter register.

16. The non-transitory computer readable medium of claim 13, in which the exception program counter register is a supervisor exception program counter register.

17. The non-transitory computer readable medium of claim 13, in which the exception program counter register is a user exception program counter register.

18. The non-transitory computer readable medium of claim 13, in which the exception program counter register is a virtual supervisor exception program counter register.

* * * * *